United States Patent Office 3,094,658
Patented June 18, 1963

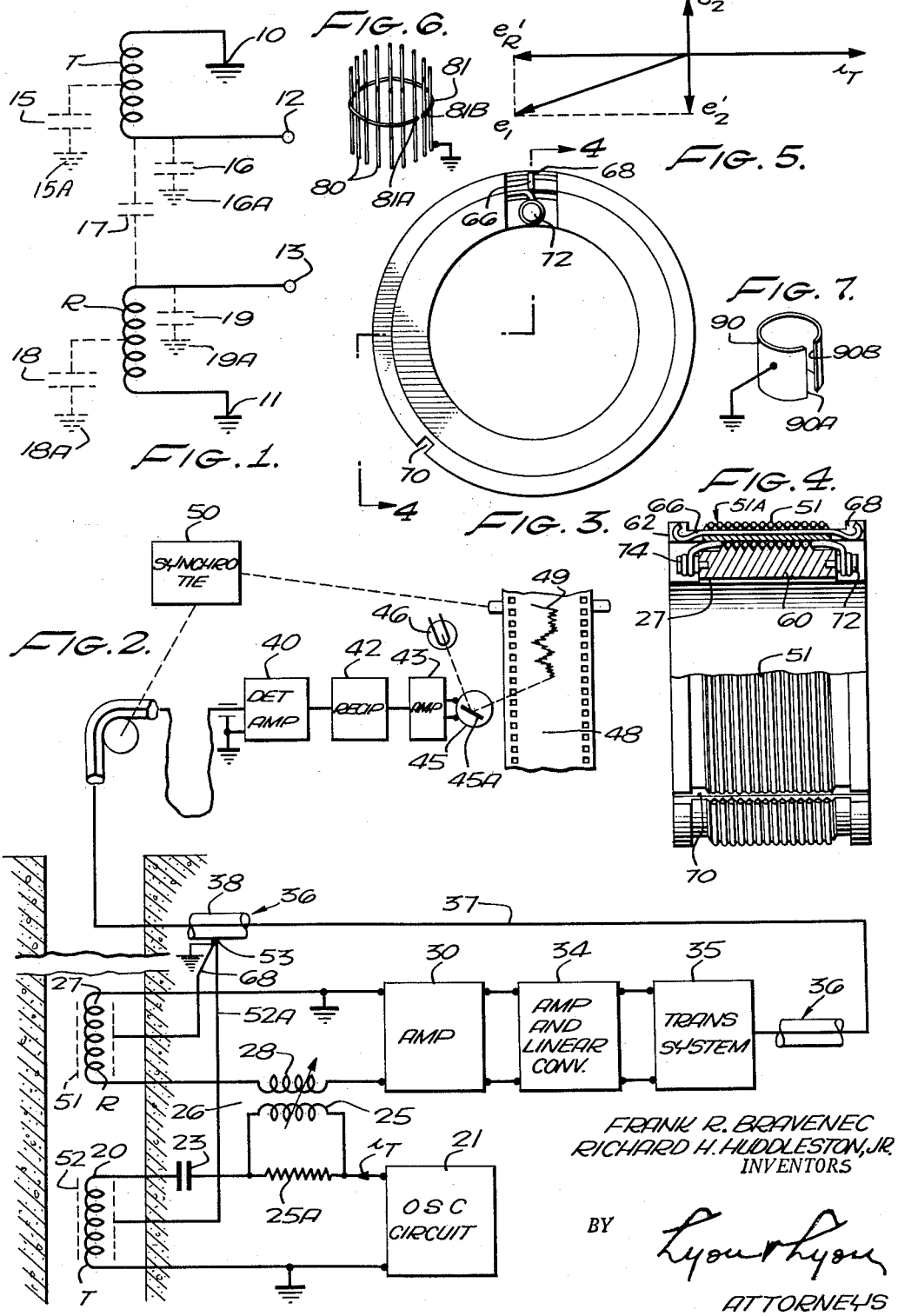

3,094,658
LOGGING SYSTEM USING ELECTROSTATICALLY SHIELDED COILS
Frank R. Bravenec and Richard H. Huddleston, Jr., Houston, Tex., assignors to Halliburton Company, a corporation of Delaware
Filed Mar. 17, 1959, Ser. No. 799,982
7 Claims. (Cl. 324—6)

The present invention relates to an improved induction logging system and particularly one which eliminates erroneous indications which are otherwise occasioned when logging in a well bore filled with mud, and particularly one which gives accurate indications of the formation conductivity when the same is of relatively low value (high resistivity).

Usually high-resistivity formations are of greatest interest to one making a determination of oil-bearing or conducting strata. However, it has been discovered by applicants that using a conventional induction logging system, unwanted signals are induced electrostatically into the conventional measuring system and that the same produce erroneous indications which are more pronounced when logging adjacent such high-resistivity formations and/or when a mud column is between the transmitter and receiver coils of the system.

Usually the components in an induction logging tool are preadjusted on the surface prior to lowering in a well bore. Such adjustments on the surface, however, are made with respect to particular conditions and with the expectation that differences in each formation conductivity will be indicated on a linear scale. In accordance with the present discovery, it has been found that the attainment of this desired result requires additional precautions than have heretofore been considered unnecessary.

Heretofore, it has been realized that the transmitter coil in an induction logging system not only produces eddy currents in the formation in accordance with the voltage induced therein by the current flowing in the transmitter coil, but also the transmitter coil induces an undesirable voltage in the receiver coil by direct transformer action. This undesirable voltage is sometimes referred to as the quadrature component or voltage since the same is considered to have a 90-degree phase relationship with respect to the transmitter coil current and also a 90-degree phase relationship with respect to that voltage induced in the receiver coil by the formation eddy currents. This latter voltage is the desired voltage which is desired to be effectively measured and recorded to provide an indication of the conductivity of the formations through which such eddy currents flow. Some means are usually provided to effectively balance out this undesired quadrature component using, for example, an auxiliary transformer having a primary winding through which the transmitter coil current flows for inducing a bucking or balancing voltage in a secondary winding connected in the receiver coil circuit; and the mutual inductance between the windings of this transformer, for this purpose, are adjusted in the logging tool while it is on the surface under given conditions which, however, vary in the use of the logging tool, particularly when the same traverses formations having a large range of resistivity; and thus the adjustment may not be the best possible adjustment under all conditions encountered, particularly when no precautions are taken to guard against varying electrostatic conditions existing in the well bore. Not only is the quadrature voltage balancing system altered undesirably, but of greater significance is that fact that the voltage which otherwise is indicative of formation currents is altered and thus the electrostatic effects result in erroneous indications or measurements.

In a study of induction logging systems not only must the amplitude of the various voltage components which are induced magnetically in the receiver coil be considered, but also consideration must be given to the phase relationships of the various components. Further, in accordance with teachings of the present invention, consideration is also required to be given to not only the amplitude of the currents which may flow as a result of electrostatic capacitive effects but also their relative phases, one with respect to the other, and also with respect to the voltages and currents produced by purely magnetic effects. Such currents and voltages due to electrostatic capacitive effects are not readily susceptible to precise determinations (other than that they produce deleterious and erroneous indications of formation resistivity) largely because the same are found to vary considerably in accordance with various conditions, particularly those existing adjacent different formations traversed by the logging tool.

However, in accordance with the present invention, the various electrostatic capacitive effects which otherwise are susceptible of variation and which are effective to produce erroneous variations in measurements or indications, based solely on magnetic considerations, are effectively eliminated or stabilized using an electrostatic shielding system.

It is therefore an object of the present invention to provide an improved induction logging system in which electrostatic capacitive effects are taken into account and substantially eliminated or stabilized.

Another object of the present invention is to provide an improved induction logging system which is particularly accurate in logging high-resistivity formations.

Another object of the present invention is to provide an improved induction logging system in which the conductivity (or resistivity) indicated or measured is in direct linear proportion to the formation conductivity, particularly when the same extends over a considerable range from relatively high conductivities to relatively low conductivities.

Another object of the present invention is to provide an improved induction logging system in which the accuracy of formation conductivity indications or measurements is not detrimentally influenced by mud conditions in the well bore.

Another object of the present invention is to provide an electrostatic shield construction for coils used in induction logging.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates, in diagrammatic form, various distributed electrical capacities which may be assumed to be associated with the transmitter and receiver coils of an induction logging system and which may vary in accordance with particular conditions found in a well bore.

FIGURE 2 is a schematic drawing of an improved system embodying features of the present invention.

FIGURES 3 and 4 illustrate a typical shielded coil construction embodying features of the present invention and used in the system shown in FIGURE 2, FIGURE 3 being a view in end elevation and FIGURE 4 being a section taken on the line 4—4 of FIGURE 3.

FIGURE 5 is a vector diagram showing the phase relations between currents and voltages in FIGURE 2.

FIGURES 6 and 7 show different shield constructions.

The system shown in the drawings is simplified to show a basic two-coil system which includes a single transmitter coil T and a receiver coil R. It is understood, of course, that multiple receiver and/or transmitter coils may be used and spaced along the axis of a well bore as are used at the present time and that the present concepts, principles and coil constructions are applicable also to such multiple coil systems.

Thus, FIGURE 1 serves to illustrate the transmitter and receiver coil systems of present-day induction logging systems. The one or more transmitter coils are represented by coil T and the one or more associated received coils are represented by the coil R.

As shown, one terminal of each of coils T and R is grounded at points 10 and 11 and these points are usually connected by a solid metallic conductor to a grounded cable sheath having an inner conductor through which the logging information is transferred to the surface above a well bore within which the coils T and R on a logging tool are mounted. The points 10 and 11 may thus be considered to be "solid" grounds for purposes of the present discussion.

The other terminal 12 of coil T is usually connected to an ungrounded output terminal of a power oscillator supplying an energizing current flowing through coil T and varying at the rate of, for example, 20 kilocycles (kc.).

The other terminal 13 of coil R is usually connected to the ungrounded terminal of a circuit which serves to amplify the voltages produced in the coil R; and such circuit may include means exemplified in FIGURE 2 at 25 and 28 for balancing out the so-called quadrature voltage component referred to above.

Also shown in FIGURE 1 using dotted lines, is a plurality of electrical capacities or condensers 15, 16, 17, 18 and 19 which are considered to be representative of various distributed electrostatic capacities, which influence the accuracy of the conductivity or resistivity measurements or indications, i.e. influence the voltages developed in receiver coil R.

Thus, for example, condenser 18 may be considered to be the distributed capacity of one or more turns of the receiver coil R with respect to the surrounding medium, i.e. adjacent well formation and/or mud when the well bore is filled with mud. Similarly, the condenser 15 indicates a similar distributed capacity between one or more turns of transmitter coil T with respect to the surrounding medium. Likewise, the condenser 17 represents the electrostatic capacity between the receiver and transmitter coils; and condensers 16 and 19 represent the distributed capacity with respect to the surrounding medium from the so-called "hot" ends of coils T and R respectively.

The magnitudes of each of these capacities may be considered to vary depending upon the character of the surrounding medium. Further, while each one of these condensers 15, 16, 18 and 19 are shown as having one plate thereof connected to a ground point 15A, 16A, 18A and 19A respectively, the particular potential of each one of these points 15A, 16A, 18A and 19A may also vary depending on surrounding conditions and hence they may be referred to as "floating" ground points through which currents of different amplitude and different phase may flow during the logging operation, thus producing different effects in receiver coil R.

In accordance with important features of the present invention, the effect of distributed and changeable electrostatic capacities, as typified in FIGURE 1, are substantially eliminated or stabilized whereby more accurate conductivity or resistivity determinations are made. This is accomplished by providing an electrostatic shield around, one or more, preferably around both coils, and connecting such shield or shields, as the case may be, to a common fixed or "solid" ground point.

A typical system embodying the present invention is now discussed in connection with FIGURES 2–5.

The transmitter coil 20 is energized with current from a power oscillator circuit 20 operating at, for example, a frequency of 20 kilocycles. For this purpose usually the coil 20 is tuned to that frequency by the tuning condenser 23 connected in series with coil 20 and means (not shown) are associated with such oscillator circuit for maintaining the transmitter coil current constant. One terminal of the oscillator circuit 21 is connected through the low valued resistance 25A and condenser 23 to one terminal of transmitter coil 20, the other terminals of coil 20 and the oscillator circuit being grounded. Primary winding 25 of transformer 26 is connected in shunt to resistance 25A which may have a value of one tenth ohm.

The receiver coil 27 has one of its terminals grounded and the other one of its terminals connected through the secondary winding 28 of transformer 26 to one input terminal of a 20 kc. amplifier 30, the other input terminal being grounded so that the voltage applied to the input circuit of amplifier 30 includes those voltages induced magnetically in receiver coil 27 and that voltage induced by primary winding 25 into the secondary winding 28.

It is understood that, in accordance with conventional practice, the two coils 20 and 27 are mounted on a logging tool so as to be spaced along the axis of the well bore traversed by such tool and with the axis of each coil aligned with the well bore axis.

As shown in FIGURE 5, voltages or voltage, represented by $e_1$ and induced in the receiver coil 27 as a result of current flowing in the transmitter coil 20, may be considered to comprise essentially two components, namely a first voltage component which is represented as $e'_2$ and is induced directly by transformer action by coil 20, and a second voltage component $e'_R$ induced as a result of currents induced in the earth formations. FIGURE 5 shows the same in phase relationship to $i_T$, the current flowing in the transmitter coil 20.

The quadrature component $e'_2$ is balanced or substantially balanced out in the input circuit to amplifier 5 by the voltage $e_2$ which is properly phased and induced in secondary winding 28 by the current $i_T$ flowing in the primary winding 25.

The amplifier 30, which is stabilized for high gain, has its output in the form of an amplified 20 kc. signal applied to the input circuit of an amplifier and linear converter 34 in which a unidirectional or D.C. voltage is developed in its output circuit.

This converted D.C. signal in the output of stage 34 is applied to a transmission system 35 for transmitting over logging line 36 and to surface equipment information relative to such signal. The transmission system 35 is conventional and may, for example, include a multivibrator having the amplitude of its output modulated in accordance with this D.C. signal and such modulated output is used in the form of a subcarrier to frequency-modulate a carrier transmitted over the logging line or cable 36 having an inner conductor 37 and a grounded sheath 38.

At the surface, the frequency-modulated signal is suitable detected and amplified in stage 40 which has a unidirectional output signal representative of the conductivity of the formations. This output signal may be recorded directly to produce a conductivity log after amplification in stage 43; or in case a resistivity log is desired, this output signal is first applied to a conventional so-called reciprocal network 42 and the output of such network 42 after amplification in stage 43 is applied to the recording galvanometer 45 having its mirror 45A directing a beam of light from lamp 46 onto the photographic film 48 to produce the resistivity log 49.

It is understood, of course, that the film 48 is moved in synchronism with the logging tool in which the subsurface equipment is mounted and this is so indicated in FIGURE 2 by the synchro-tie 50 which is representative of well known means for accomplishing this result.

In order to achieve accurate conductivity or resistivity indications, a separate electrostatic shield 51 is placed around each one of the receiver coils represented by receiver coil 27; and preferably also a separate electrostatic shield 52 is placed around each one of the transmitter coils represented by coil 20. Further, each shield is connected to a single common ground point represented by the ground point 53. In other words, instead of first interconnecting the shields by one wire and then using a second wire to connect such one wire to a ground point, it is considered highly desirable and in some cases necessary to run a separate lead from each shield to a common ground point.

A typical coil and its associated shield structure is shown in FIGURES 3 and 4.

The coil 27 is wound on a mandrel 60 which comprises a section of epoxy-fibreglass threaded tubing with threads thereon having a pitch diameter of approximately 25% greater than the diameter of the wire used for such coil 27. By using a threaded construction, the wire, once it is in place, is prevented from moving and thus the possibility of adjacent turns moving and short-circuiting is eliminated.

The shield form 62 which is a section of tubing having an inside diameter slightly greater than the outside diameter of form 60 and thus snugly fits over the same is cemented over the top of form 60, using an epoxy cement. This form 62 is previously likewise threaded with threads on its outer surface, such threads also having a pitch diameter larger than the diameter of the wire 51 in such thread and forming the shield 51A for coil 27.

It is noted that in winding the wire 51 on form 62, the same is wound over a metallic bar 66 which is maintained in a precut groove or slot 68 in form 62 so that such bar 66 short-circuits adjacent turns of the coil-type shield 51A. Preferably each such turn of coil 51A is soldered to the bar 66 which serves as a lead or terminal for a wire such as wire 68 in FIGURE 2 that is connected to a common ground point 53 with a similar wire 52A from shield 52.

The outside of the shield is then covered with epoxy cement and the assembly is then allowed to cure. After the cement has been cured, a gap or slot 70 is cut lengthwise through the shield coil and partly into the form 60, as shown, using, for example, a hacksaw, so as to produce a shield comprising interrupted turns of wire with no short-circuited turns. The result is a finger-like shield 51 which wraps around the coil 27 with the "ends" of such fingers being separated by slot 70.

In a typical construction, the coil 27 may comprise 15 turns of No. 17 solid copper wire having opposite ends soldered to terminal lugs 72 and 74 extending outwardly from the sides of the coil form 60 in which the same are embedded.

The coil shield 51A made in accordance with the above procedure may comprise 25 turns of No. 20 solid tinned copper wire with the ends thereof and adjacent turns being soldered to the shorting bar 66.

Using shielded coil constructions as thus described, it will be clear that those capacities exemplified in dotted lines in FIGURE 1 are substantially eliminated or stabilized so as to achieve the advantages indicated above. Using these expedients, the pretuned condition of the transmitter coil 20 is inappreciably affected by different formations, the balance effected by transformer 26 is inappreciably disturbed by different formations, and that voltage which is indicated or measured as being that due to formation eddy currents is more representative of the same. All in all, the accuracy is enhanced particularly in logging formations of high resistivity where capacitive effects exemplified in FIGURE 1 become more pronounced.

While the shield structure preferably takes the form illustrated in FIGURE 4 other shield structures may be used. Thus, FIGURE 6 shows an electrostatic shield comprising a series of parallel conducting wires or bars disposed around the circumference of a circle to define generally an open ended cylinder. A conducting wire 81 is soldered to an intermediate portion of each wire 80. This wire 81 is also thus circular, but has two spaced ends 81A and 81B so as to prevent the flow of circulating current which otherwise would be produced if the ends 81A and 81B were connected together. Each wire 80 is slightly longer than the axial length of either a receiver or a transmitter coil, as the case may be, which is coaxially disposed therein in the manner illustrated in FIGURE 4.

FIGURE 7 shows another shield structure 90 which although not preferred may be used in some instances where the flow of eddy currents in the shield itself are not objectionable. The shield 90 is of conducting material and is simply formed from a strip into generally an open ended cylinder in which the edges 90A and 90B are separated to minimize eddy current flow. As in FIGURES 4 and 6 the length of the shield is somewhat longer than the axial length of a coil centrally disposed in the same.

In each case the shields are grounded. Thus, in a multi-coil system, each and every one of the receiver shields are interconnected and a single wire therefrom is connected to a common ground point to which also a single wire that is connected to each transmitter coil is connected to thereby avoid the possibility of there being a common impedance, formed by a portion of a wire, through which both receiver and transmitter shield currents flow.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:
1. In an induction logging system wherein a transmitter coil induces an eddy current in formations and such eddy current induces a voltage in a receiver coil, a mandrel mounting one of said coils, a second mandrel mounted on and outside of the first mentioned mandrel in coaxial relationship therewith, a winding on the second mandrel having an axial length somewhat greater than the axial length of the winding on the first mandrel, said winding on said second mandrel having each one of its turns interrupted and each one of said turns being electrically connected together.

2. In an induction well logging system wherein a transmitter coil induces an eddy current in formations and said eddy current induces a voltage in a receiver coil, a logging line for transmitting a signal derived from said receiver coil, said logging line having a grounded outer sheath, a separate electrostatic shield surrounding each of said transmitter and receiver coils, each of shields being connected by a separate wire to a common ground point on said sheath.

3. In an induction well logging system, a coil construction comprising a first coil, a second coil surrounding said first coil and having an axial length such that the ends of said second coil overlap the ends of said first coil, said second coil comprising a plurality of turns each of which is interrupted, and means electrically interconnecting each one of said turns.

4. An induction well logging system incorporating a logging tool having mounted thereon a transmitter coil for inducing currents of a particular frequency in surrounding formations of different resistivities in a bore hole, and a receiver coil for developing a voltage therein in accordance with said currents and of an intensity depending upon the resistivity of said formations, an oscillator circuit for supplying current of said particular frequency to said transmitter coil, circuit means coupling said oscillator circuit to transmitter coil, said circuit means including means tuning said coil to said particular frequency with however formations of different resistivities tending to produce a detuning of said transmitter coil, a first electrostatic shield surrounding said transmitter coil and substantially preventing said detuning of said transmitter coil, both the amplitude and phase of said voltage developed in said receiver coil also tending to change adversely with respect to a reference as a result of change in resistivity of said formations, a second electrostatic shield surrounding said receiver coil and substantially preventing said change, said first and second shields serving to electrostatically shield said transmitter and receiver coils from each other and from the ambient formations to prevent the aforementioned detuning of said transmitter coil and to prevent said change with respect to said reference, said logging tool having a shielded cable with an outer metal conductor extending therefrom and up through said bore hole, and separate grounding conductors interconnecting respectively said first and second shields to a common point on said metal conductor.

5. In a bore hole logging system, a transmitter coil for inducing an eddy current in formations, a receiver coil wherein said eddy current induces a voltage, the axis of each of said transmitter and receiver coils being aligned generally with the axis of the bore hole, and a separate shield around each of said transmitter and receiver coils, each shield also being generally axially aligned with said bore hole and arranged coaxially with the corresponding coil, said shield being in the form of a coil having interrupted turns, with each interrupted turn being interconnected.

6. In a bore hole logging system, a transmitter coil for inducing an eddy current in formations, a receiver coil wherein said eddy current induces a voltage, the axis of each of said transmitter and receiver coils being aligned generally with the axis of the bore hole, and a separate shield around each of said transmitter and receiver coils, each shield also being generally axially aligned with said bore hole and arranged coaxially with the corresponding coil, said shield comprising a series of parrallel spaced conductors lying along the circumference of a circle, and an interrupted conducting loop extending around said circle and connected to each of said spaced conductors.

7. In a bore hole logging system, a transmitter coil for inducing an eddy current in formations, a receiver coil wherein said eddy current induces a voltage, the axis of each of said transmitter and receiver coils being aligned generally with the axis of the bore hole, and a separate shield around each of said transmitter and receiver coils, each shield also being generally axially aligned with said bore hole and arranged coaxially with the corresponding coil, said shield comprising a strip of conducting material formed into an open ended cylinder with adjacent edges of the strip separated electrically.

References Cited in the file of this patent
UNITED STATES PATENTS

| | | |
|---|---|---|
| 322,128 | Thomson | July 14, 1885 |
| 2,220,070 | Aiken | Nov. 5, 1940 |
| 2,223,737 | Moses | Dec. 3, 1940 |
| 2,623,923 | Zimmerman | Dec. 30, 1952 |
| 2,723,375 | Schuster | Nov. 8, 1955 |
| 2,928,039 | Huddleston | Mar. 8, 1960 |
| 2,948,846 | Coufleau | Aug. 9, 1960 |
| 3,012,189 | Doll | Dec. 5, 1961 |
| 3,013,102 | Doll | Dec. 12, 1961 |